J. F. WIXFORD.
WATER PURIFICATION SYSTEM.
APPLICATION FILED MAY 1, 1905.
917,918.
Patented Apr. 13, 1909.
3 SHEETS—SHEET 1.
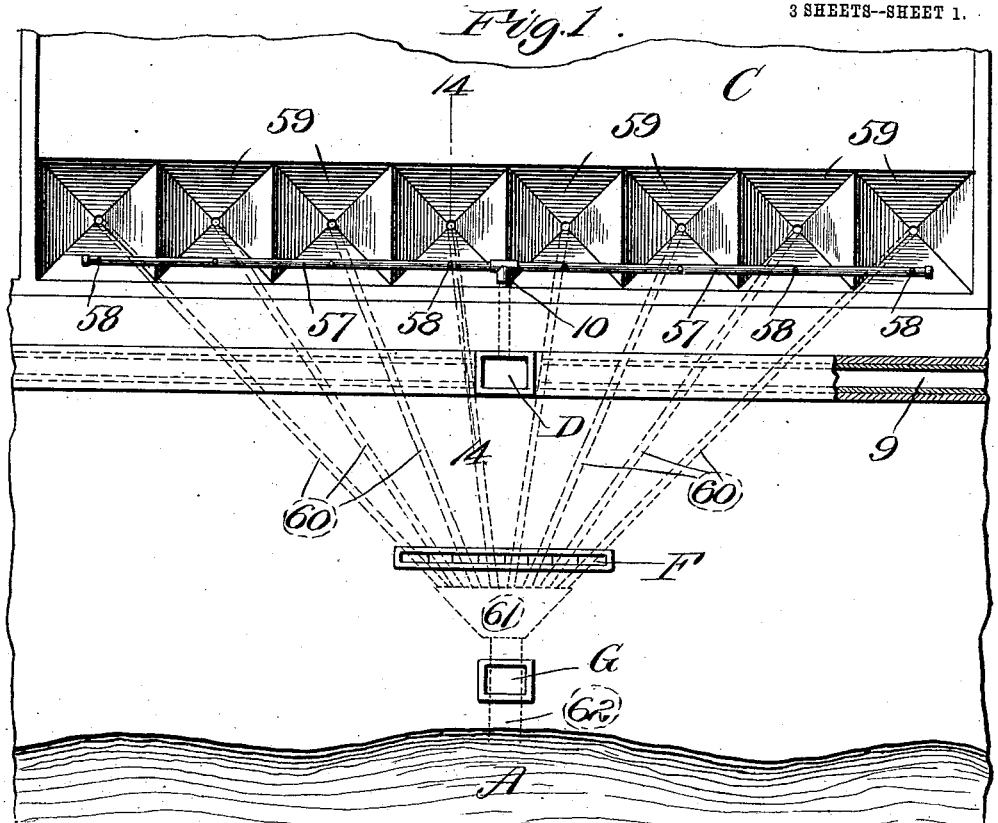
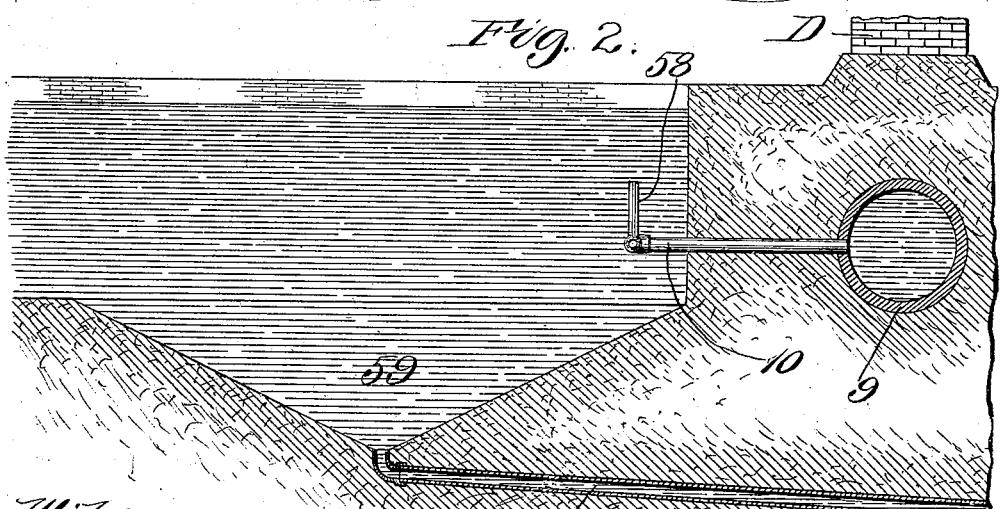

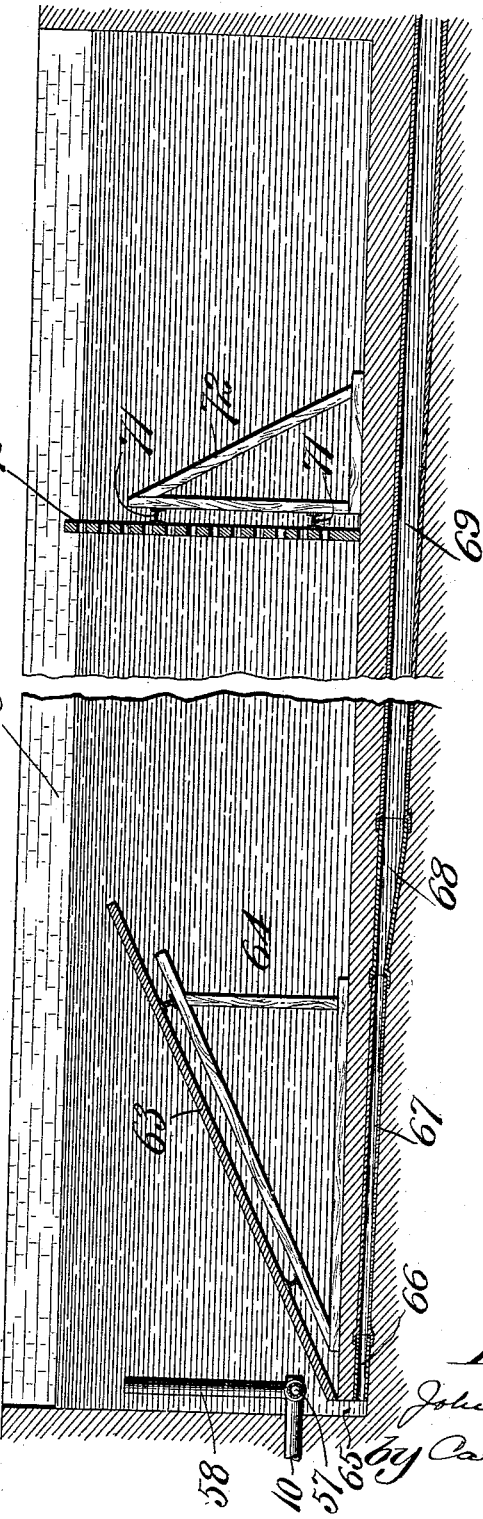

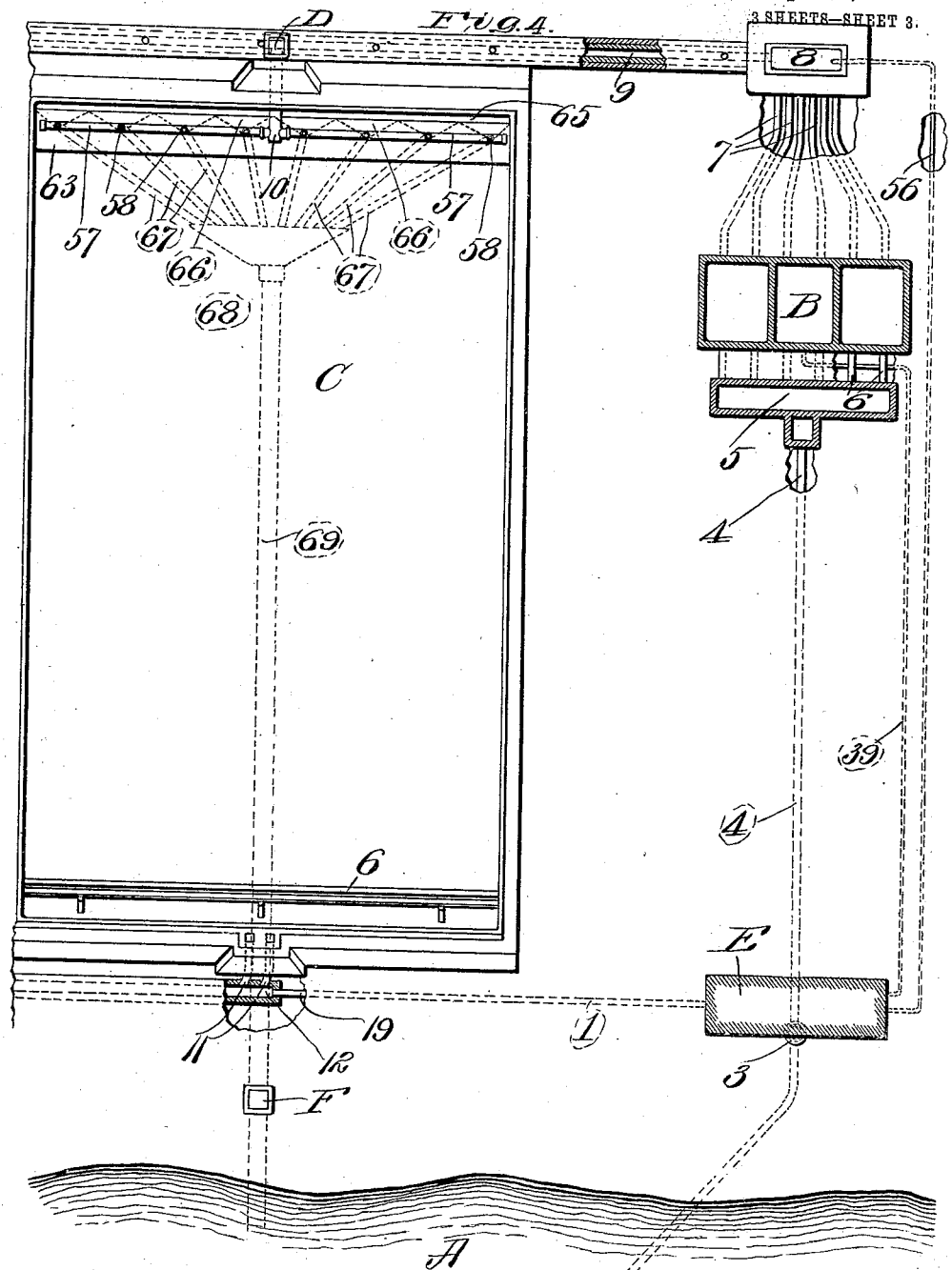

UNITED STATES PATENT OFFICE.

JOHN F. WIXFORD, OF ST. LOUIS, MISSOURI, ASSIGNOR TO WIXFORD WATER PATENTS COMPANY, OF ST. LOUIS, MISSOURI, A CORPORATION OF MISSOURI.

WATER-PURIFICATION SYSTEM.

No. 917,918.   Specification of Letters Patent.   Patented April 13, 1909.

Application filed May 1, 1905. Serial No. 258,228.

*To all whom it may concern:*

Be it known that I, JOHN F. WIXFORD, a citizen of the United States, and a resident of the city of St. Louis and State of Missouri, have invented a new and useful Improvement in Water-Purification Systems, of which the following is a specification.

My invention relates to systems for the purification of the water supplies of cities.

It has for its principal objects to provide a system capable of adaptation to water works plants of existing types; to collect the precipitated matter and sediment and remove it from the settling basin without emptying the basin; to remove the precipitated matter and sediment from basins the bottom of which may be below the level of the water in the river or body of water into which it is to be directed; to make the flow of water in the settling basins uniform and equal throughout the whole basin; and other objects hereinafter more fully appearing.

My invention consists in the combinations and arrangements hereinafter described and claimed.

In the accompanying drawings forming a part of this application and wherein like symbols refer to like parts wherever they occur, Figure 1 is a plan view of one end of a settling basin especially adapted for use as a part of my system: Fig. 2 is a vertical sectional view thereof on the line 14—14 of Fig. 1 on an enlarged scale; Fig. 3 is a longitudinal section through a basin of ordinary type adapted to use my system; and, Fig. 4 is a plan view of the entire system including a settling basin.

The improved system for the purification of water is shown, for the purpose of illustration, as applied to a water works plant employing settling basins. The supply of water is supposed to be derived from a river A, in which is built an intake tower 1. An intake tunnel or conduit 2 leads from the intake tower to an uptake shaft 3 which rises to the level of the ground. A tunnel or conduit 4 connects with the uptake shaft at a point considerably above the entrance point of the intake tunnel or pipe and conveys the water to a wet-well 5. Pipes 6 lead from the wet-well to a pump house B in which are located pumps that force the water through the pipes 7 to a delivery well 8. A conduit 9 leads from the delivery well along one end of the settling basins C, of which one is shown. A pipe 10 leads from the conduit 9 into the settling basin and the admission of water is controlled by gates beneath a gate house D. The water emerges from the settling basin at its opposite end through pipes 11 into a clear water conduit 12 which runs along the ends of the settling basins. The plant, so far as described, is one of known type. To it my system is applied without any necessity for reconstruction of the plant, the adaptation being accomplished solely by means of additions. This adaptability of the system to existing plants without necessitating expensive reconstruction is one of its merits.

The process of purification for which this system is primarily adapted contemplates the coagulation of the matter to be eliminated by the addition of a reagent, such as a solution of ferrous sulfate, to the water at one point and the subsequent addition of hydrate of lime, preferably milk of lime, in quantities greatly in excess of that necessary to satisfy the ferrous sulfate in solution. This process is fully described and claimed in Letters Patent No. 807,008, granted to him therefor December 12, 1905.

As stated hereinbefore, by the time the water reaches the settling basins the reactions are substantially complete and the resulting insoluble precipitates are held in suspension and are ready to be deposited as soon as the water is quiet enough to permit sedimentation. In this condition the water enters the basins.

Lateral branch pipes 57 are connected to the pipes 10 leading from the conduit 9 to the basin. Vertical pipes 58 lead upwardly from the branch pipes 57 to within two or three feet of the water level in the basin. Thus the volume of water entering the basin is broken up into a number of small vertical streams and violent agitation in the basin is avoided. As the pipes 58 are uniformly distributed across the end of the basin, a practically uniform current or flow is induced over the entire width of the basin. Consequently the velocity of flow can be quite low and the water will be comparatively quiet, a condition to be desired for sedimentation. Experience has shown that nearly all the precipitates will coagulate and come down in a short time, and within a short distance from the point of admission of the water. Thus, by far the larger part of the sediment will be deposited near the end of the basin at which the water is admitted.

Means are provided for collecting this sediment and removing it from the settling basin without emptying the basin. The preferred form of basin for this purpose is shown in Figs. 1 and 2. The pipe 10 and its branch pipes 57 and their upwardly extending pipes 58 are arranged at the end of the basin adjacent the river A, and the clear water is drawn off at the end farthest from the river. The floor of the basin at the end at which the water is admitted is provided with a plurality of pockets or depressions 59. These pockets are shown as pyramidal in shape, though they may be conical. The walls thereof, which are inclined sections of the floor of the basin, are inclined at an angle greater than the angle of rest of the sediment. Hence, the sediment will tend to slide to the bottom of the pocket. The pockets open at their bottoms into sewer pipes 60 which empty into a sewer-head 61 connected to a larger sewer-pipe 62. A gate-house F contains gates by means of which any one of the pipes 60 may be opened or closed. The large sewer-pipe 62 is controlled by a gate in a gate house G.

The pipes 58 are arranged in the longitudinal center-lines of said pockets and at some distance from the wall of the basin. The water will have been treated with the coagulating reagents before being admitted to the basin and the larger portion of the impurities will go down as soon as the water is quiet enough to permit it to do so. If the pockets are so proportioned to the length of the basin and the rate of flow therethrough that under the normal conditions of the system it will require an hour or two for the water to flow over the pockets, almost all of the impurities will be deposited in the pockets. When the sewer is opened the sediment will flow out of the pockets of its own weight and under the pressure of the water in the basin. Thus, the pockets can be cleaned at frequent intervals without emptying the water from the basins and with the use of a small amount of water. So small an amount of the impurities will remain in the water to be deposited in the body of the basin that it will not need to be cleaned for very long periods.

In addition to the saving of time, water and expense, the arrangement for cleaning the basin without emptying it, is advantageous for the reason that it makes it possible to clean basins whose bottoms are below the level of the water of the river into which the basins drain. This is a common condition during periods of high water and as it is impossible to drain the basins during such times it has been the practice heretofore to allow the sediment to accumulate until the river has subsided to a point below the bottom of the basins. By my arrangement, the pockets can be cleaned so long as the level of the water in the basin is high enough above the level of the water in the river to give a sufficient head to overcome the friction of the sediment in the sewer pipes. Thus, the basin can be cleaned when the level of water in the river is several feet above the bottom of the basin.

Fig. 3 illustrates my system adapted to existing basins without extensive alterations thereof. An inclined floor 63 sloping upwardly and forwardly is supported on a frame work 64 resting on the floor of the basin. The inclined floor does not extend to the surface of the water. The upper end of the inclined floor is so far below the surface of the water as to leave ample cross-section above for the flow of the required volume of water. At the bottom of the basin and at the rear end of the inclined floor, a gutter 65 is formed. A number of flat primary sewer-heads 66 having converging sides open into said gutter. At their narrower ends, the sewer-heads 66 connect to pipes 67 which empty into a main sewer-head 68, of the same general shape as the primary sewer-heads 66. To the main sewer-head, a sewer 69 is connected which empties into the river. Flow through the sewer is controlled by means of gates in the gate-house F.

The inclined floor, preferably, extends in the direction of flow of the water through the basin such a distance and the rate of the flow through the basin is such, that water entering through the pipes 58 will remain above the floor from one to two hours. During this time the coagulation is most rapid and the larger part of the sediment will go down. The sediment will slide down the inclined floor into the gutter and will accumulate between the end of the basin and the lower rear end of the inclined floor. When the quantity accumulated is objectionably large, the sewer is opened and the pressure of the water in the basin will force sediment down into the sewer and through it into the river. This can be done in a short time and but little water will be needed. The sediment can be thus removed once a day, once a week or once a month (depending on the condition of the water treated) without emptying the basin. Not all the sediment will be deposited on the inclined floor, but so small an amount will be carried beyond it that it will not be necessary to drain and clean the whole basin oftener than once a year.

Under certain conditions, a siphon will be preferable to a sewer of the kind shown for drawing off the sediment. This, however, does not change the principle of providing means for carrying the sediment into the gutter or the pocket so that it may be drawn off.

To secure a uniformity of flow across the entire basin and prevent the usual currents at the center of the basin with eddy-currents at the sides thereof, due to withdrawing the water at the center of the end of the basin, a perforated baffle 70 is provided. This baffle may be made of wood and comprises boards secured to I-beams 71 carried by frame-work 72 resting on the floor of the basin. The baffle is perforated with a large number of holes and it extends above the surface of the water. The holes are distributed along the entire length of the baffle and at various depths and of such size that it will be impossible for the entire volume of water withdrawn from the basin to pass through much fewer than all of them. Hence, there must be a flow throughout the width of the basin. It is obvious that the baffle could be made of parallel boards with slits or spaces between them.

In consequence of the arrangement above described, the stream flowing into the settling basin is subdivided into a number of small streams regularly distributed over the width of the basin. The pipes 58 being directed upwardly, the velocity of the inflowing streams is partly reduced by gravity and partly by the water above the tops of the pipes. Thus, there is practically no impulse, due to the inflowing streams, in the direction of flow through the basin and the water comparatively near to said pipes will be quiet. The water flows over the inclined portion of the bottom or the depressions. At this time the impurities are being rapidly precipitated and by far the larger part of them will be deposited before the water has passed beyond the depressions. The sediment deposited in the depression will slide down the sides thereof and will collect in the lower portions, whence, it may be drawn off as often as desired by opening the sewer pipes. The water will carry a comparatively small amount of impurities beyond the depressions and hence, the main portions of the basin will not need to be cleaned for a very long time. The water flows in a uniform stream across the basin on account of the subdivision of the inflowing stream and the baffle at the delivery end of the basin. The size of the basin is, preferably, such that it will take the water forty-eight hours to flow from one end to the other, though very good results can be secured if less time is allowed.

Obviously, my system is capable of considerable modification within the scope of my invention and, therefore, I do not wish to be limited to the specific arrangements shown and described. For instance, an auxiliary basin may be employed into which the water may be introduced from the conduit and in which the sediment may collect as it does in the depressions of the basins hereinbefore described. From this basin the water may flow into a main basin; in which case, no provision for collection of and drawing off the sediment from the main basin need be made.

What I claim as my invention and desire to secure by Letters Patent is:

1. A system of water purification comprising a continuously open settling basin of the kind used in municipal water works plants, a conduit leading from a source of water supply to said basin, a plurality of upwardly extending submerged pipes in said basin connected to said conduit, and a current distributing baffle near the delivery end of said basin.

2. A system of water purification comprising a continuously open settling basin suitable for use in municipal water works plants, a conduit leading from a source of water supply to said basin, a plurality of upwardly extending submerged pipes in said basin and connected to said conduit, and a current distributing baffle near the delivery end of said basin arranged to distribute the current throughout substantially the whole cross sectional area of the basin, the portion of the floor of said basin over which the incoming water first flows being inclined, and a sewer opening into said basin near the lowest point of said inclined floor.

3. A system of water purification comprising a continuously open settling basin of the kind used in municipal water works plants, a conduit leading from the source of water supply to said basin, and means to reduce the velocity of water upon entering said basin and to produce a transversely uniform flow through said basin, said means comprising a plurality of upwardly extending submerged pipes regularly distributed throughout the width of one end of said basin and connected to said conduit, an outlet at the opposite end of said basin and a current distributing baffle near the outlet end of said basin, the portion of the floor of said basin over which the incoming water first flows being inclined, and a sewer opening into said basin near the lowest point of said inclined portion.

4. A system of water purification comprising a continuously open settling basin of the kind used in municipal water works plants, a conduit leading from a source of water supply to said basin, means to introduce a coagulating reagent into said conduit at such a distance from said basin that the water will be in condition for the impurities therein to coagulate upon reading said basin, a plurality of upwardly extending submerged pipes regularly distributed throughout the width of one end of said basin connected to said conduit, an outlet at the opposite end of said basin, and a current distributing baffle near the outlet end of said basin, and a sewer opening into said basin near the water admission end thereof.

5. A system of water purification comprising a continuously open settling basin of the kind used in municipal water works plants, a conduit leading from a source of water supply to said basin, and means to introduce a coagulating reagent into said conduit, a plurality of upwardly extending submerged pipes regularly distributed throughout the width of one end of said basin connected to said conduit and an outlet at the opposite end of said basin and a current distributing baffle near the outlet end of said basin, and a sewer opening into the bottom of said basin near the point of admission of the water supply.

6. A system of water purification comprising a continuously open settling basin of the kind used in municipal water works plants having a portion of its bottom inclined, and a sewer opening into said basin near the lowest point of said inclined portion, a conduit leading from a source of water supply to said basin, a plurality of upwardly extending submerged pipes arranged above said inclined portion of said bottom and connected with said conduit, a delivery outlet and a current distributing baffle at the delivery end of said basin between the points of water inlet and delivery.

7. In a system of water purification, a continuously open settling basin, of a kind used in municipal water works plants, a plurality of upwardly extending submerged inlet pipes arranged across one side of the basin, an outlet at the opposite side of the basin, a plurality of depressions in the bottom of the basin and extending across one side thereof near said inlet pipes sewer connections opening into the bottom of each of said depressions, and means for controlling the flow of sediment through the sewer connections from said depressions.

8. In a system of water purification, comprising a continuously open settling basin of the kind used in municipal water works plants, means for conducting water into said basin and discharging it upwardly beneath the surface, an outlet therefor, discharge means opening into the lower portion of said basin below the place where the water is admitted and close to the vertical plane and between said plane and the delivery outlet, vertically disposed current distributing means near the outlet whereby is created a horizontal flow throughout substantially the entire cross sectional area of the basin.

9. In a system of water purification comprising a continuously open settling basin of the kind used in municipal water works plants, means to introduce water into said basin beneath the surface and along substantially the full length of one side, and an outlet therefor, at the opposite side, said basin having the portion of its bottom below and forward of the water admission point inclined downwardly, and a sewer opening into the bottom of said basin near the lowest point of said inclined portion of the bottom, and a vertically disposed current distributing baffle near the outlet whereby is created a horizontal flow throughout substantially the whole depth of the basin, the bottom of said basin being so formed as to provide an uninterrupted path for the water throughout the entire cross-sectional area of the basin from the inlet to the baffle, for the purpose specified.

10. A system of water purification comprising a sedimentation basin suitable for use in municipal water works plants, which has a water inlet arranged to admit water upwardly beneath the surface and along substantially the full length of one side and a water outlet at the opposite side and a sewer outlet, said basin comprising a main section and a marginal section continuous with each other, the marginal section being at the side where the water is admitted and having a sloping floor through the lowermost portion of which the sewer outlet opens in close proximity to the vertical plane of the inlet, and means near the outlet for distributing the horizontal flow throughout substantially the whole depth of the basin.

11. A system of water purification comprising a continuously open settling basin of the kind used in municipal water works plants, a conduit leading from a source of water supply to said basin, a plurality of upwardly opening inlets, outlets in the bottom of the basin in close proximity to the vertical plane of the inlets, a current distributing baffle near the delivery end of the basin, and an uninterrupted path for the water throughout the entire cross sectional area of the basin from the inlets to the baffle.

JOHN F. WIXFORD.

Witnesses:
JULIA B. MEGOWN,
FRED F. REISNER.